United States Patent
Zubev

(10) Patent No.: US 7,818,331 B2
(45) Date of Patent: Oct. 19, 2010

(54) RETRIEVAL OF COMPUTER SERVICE TYPE METADATA

(75) Inventor: Alexander I. Zubev, Pazardjik (BG)

(73) Assignee: SAP AG, Walldorf (DE)

( * ) Notice: Subject to any disclaimer, the term of this patent is extended or adjusted under 35 U.S.C. 154(b) by 237 days.

(21) Appl. No.: 11/413,361

(22) Filed: Apr. 28, 2006

(65) Prior Publication Data

US 2007/0255688 A1    Nov. 1, 2007

(51) Int. Cl.
*G06F 7/00* (2006.01)
(52) U.S. Cl. .................................................. 707/756
(58) Field of Classification Search .............. 707/3, 707/756
See application file for complete search history.

(56) References Cited

U.S. PATENT DOCUMENTS

| | | | |
|---|---|---|---|
| 5,721,925 A * | 2/1998 | Cheng et al. ............... 719/315 |
| 6,061,692 A * | 5/2000 | Thomas et al. ............. 707/200 |
| 6,266,673 B1 * | 7/2001 | Hong et al. ............ 707/103 R |
| 6,393,424 B1 * | 5/2002 | Hallman et al. ............. 707/10 |
| 6,988,025 B2 | 1/2006 | Ransom et al. |
| 2003/0070006 A1 | 4/2003 | Nadler et al. |
| 2003/0181196 A1 | 9/2003 | Davidov |
| 2004/0045005 A1 | 3/2004 | Karakashian |
| 2004/0111525 A1 * | 6/2004 | Berkland et al. ............ 709/231 |
| 2004/0117407 A1 * | 6/2004 | Kumar et al. ............... 707/200 |
| 2004/0167896 A1 * | 8/2004 | Eakin .......................... 707/10 |
| 2004/0216086 A1 | 10/2004 | Bau |
| 2005/0044197 A1 | 2/2005 | Lai |
| 2005/0050228 A1 | 3/2005 | Perham et al. |
| 2005/0060372 A1 * | 3/2005 | DeBettencourt et al. .... 709/206 |
| 2006/0036463 A1 * | 2/2006 | Patrick et al. ................. 705/1 |
| 2006/0123039 A1 | 6/2006 | Scheuerle, Jr. et al. |
| 2006/0136419 A1 | 6/2006 | Brydon et al. |
| 2006/0200739 A1 * | 9/2006 | Bhatia et al. ................ 715/500 |
| 2006/0242111 A1 * | 10/2006 | Goldstein ...................... 707/1 |
| 2006/0248087 A1 * | 11/2006 | Agrawal et al. .............. 707/10 |
| 2006/0265344 A1 * | 11/2006 | Woods ......................... 707/1 |
| 2006/0294134 A1 | 12/2006 | Berkhim et al. |
| 2007/0061266 A1 * | 3/2007 | Moore et al. ................ 705/51 |
| 2007/0073697 A1 * | 3/2007 | Woods .......................... 707/9 |
| 2007/0100834 A1 * | 5/2007 | Landry et al. ................ 707/10 |
| 2007/0150478 A1 * | 6/2007 | Cho et al. .................... 707/10 |
| 2007/0288520 A1 * | 12/2007 | Hatanaka et al. ......... 707/104.1 |
| 2008/0005155 A1 * | 1/2008 | Soma et al. ................ 707/102 |
| 2008/0059450 A1 * | 3/2008 | Joseph et al. ................. 707/5 |

OTHER PUBLICATIONS

"6570P375EP EP Application No. 07008350.6-1225 Extended European Search Report", (Sep. 4, 2007).

(Continued)

*Primary Examiner*—John R. Cottingham
*Assistant Examiner*—Mohammed R Uddin
(74) *Attorney, Agent, or Firm*—Schwegman, Lundberg & Woessner, P.A.

(57) ABSTRACT

A method and apparatus for retrieval of computer service type metadata. An embodiment of a method includes receiving a request from a consumer for a computer service, the computer service including a type, with the type having a set of allowed values. The method further includes configuring a first connection for computer service metadata and providing the set of allowed values via the first connection. The method also provides for configuring a second connection for computer service access.

15 Claims, 6 Drawing Sheets

OTHER PUBLICATIONS

Ballinger, Keith, et al., "Web Services Metadata Exchange (WS-MetadataExchange)", [Online] httpL//specs.xmlsoap.org/ws/2004/09/mex/WS-MetadataExchange0904.pdf, (Sep. 2004), whole document.

Vinoski, Steve, "WS-Addressub Netadata", *IEEE Internet Computing* [*online*], URL:www.ieee.org, (May 2005 thru Jun. 2005), 90-93.

Yang, S J., et al., "An Ontology Based Content Model for Web Services Description", *Services Computing, 2004. (SCC 2004). Proceedings. 2004 IEEE International Conference on Shanghai, China Sep. 15-18, 2004 Piscataway, NJ, USA IEEE*, (Sep. 15, 2004), 245-252.

Baikov, et al., *Office Action for* U.S. Appl. No. 11/413,789. Mailed May 1, 2008, pp. 1-6.

Shalloway, Alan, et al., "Design patterns explained: a new perspective on object-oriented design", Addison-Wesley, (2002).

*Non-Final Office Action for* U.S. Appl. No. 11/413,809 Mailed Dec. 11, 2008, 17 pages.

Yang, Stephen J., et al., "An Ontology Based Content Model for Web Services, Description", *IEEE*, (2004), pp. 1-8.

\* cited by examiner

RETRIEVAL OF COMPUTER SERVICE TYPE METADATA

TECHNICAL FIELD

Embodiments of the invention generally relate to the field of computer systems and, more particularly, to a method and apparatus for retrieval of computer service type metadata.

BACKGROUND

In computer operations, web services and other computer services represent powerful tools for providing flexible and easily accessible operations. A very wide variety of data and services may be presented through such services.

In web services, there often are variables that have limited values or ranges, or values that are expressed in a certain required form. One example may be codes for states, provinces, or countries, which may be represented by an abbreviation. In one particular example, each state or country may be presented by a designated two-letter code and by a display name have a certain character string. While such coding can reduce the amount of data that must be transmitted and stored and provides other advantages in operations, this system also requires that a user utilize the correct code for any value.

If a large number of codes or other possible values for inputs are needed for certain services, then the amount of metadata that must be provided to a client or user to support the services may be very large. Thus, in a conventional process there is a great deal of metadata required in every installation making use of the services.

Further, the metadata for a particular type may be the same for numerous different applications. In an example of country codes and display names, the data may be the same for many different varied web services. Thus, the same metadata is potentially duplicated many times in various different installations and in various different applications at each installation, resulting in a great amount of data storage and transfer that is required in a large enterprise to support web services. If the metadata for various types is modified, the same changes will need to be made in each installation. Thus, a small change may be greatly magnified in a large enterprise as the change is implemented in each installation and application.

SUMMARY OF THE INVENTION

A method and apparatus for retrieval of computer service type metadata.

In one aspect of the invention, a method includes receiving a request from a consumer for a computer service, the computer service including a type, with the type having a set of allowed values. The method further includes configuring a first connection for computer service type metadata and providing the set of allowed values via the first connection. The method also provides for configuring a second connection for computer service access.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
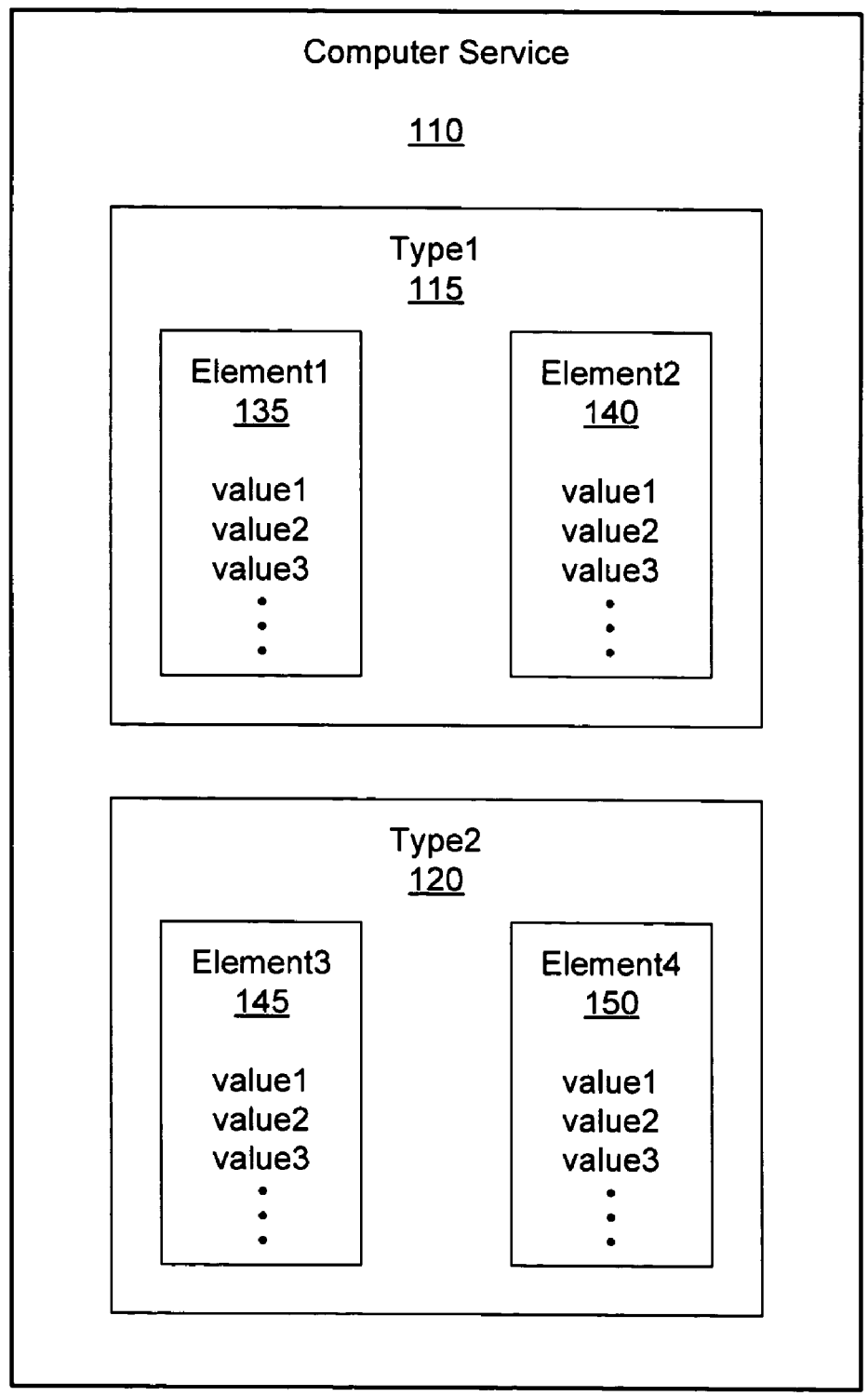
FIG. 1 is an illustration of a computer service in an embodiment of the invention.

Embodiments of the invention are generally directed to a method and apparatus for retrieval of computer service type metadata.

As used herein, a "logical address" or "virtual address" is a memory location that is addressed in terms of virtual memory. A logical address is mapped by hardware or software to a real (or physical) address. For example, a memory management unit may map virtual memory addresses to physical memory addresses.

As used here, a "physical address" is an actual or real address of a memory location. A physical address corresponds to a physical memory location.

As used herein, a "configuration" means the way in which the hardware or software of a computer is set up. Configuration includes, but is not limited to, the establishment of memory mapping requirements, including the manner in which virtual memory is mapped to physical memory.

As used herein, a "type" represents the nature of a variable or data element. The type may define the allowable values for a variable and may determine the applicable operations for the variable. "Type" includes, but is not limited to, a Java™ language type and similar data types.

In an embodiment of the invention, computer service data, including web service data, is retrieved dynamically in operation. In an embodiment of the invention, a metadata connection is configured prior to configuration of a computer service connection, the metadata connection being used to establish the metadata needed to describe variable values.

In computer service operations, variables may potentially include a variety of values that require configuration for establishment of the computer service. However, the values may result in an unwieldy number of types. If a system uses a DataDictionary approach, then all restrictions or enumerations of allowed or legal values are defined for each variable. If there are a large number of variables and each variable has a large number of possible values, then the amount of metadata to describe the data will become large. This data is normally provided for each client installation in order to allow configuration of a connection.

In an embodiment of the invention, the metadata restrictions or enumerations of possible elements for data types or variables are only stored on a provider system. In an embodiment, the metadata is retrieved from a provider system by a consumer or customer system instead of defining such metadata in all consumer applications.

In an embodiment of the invention, a metadata connection is configured prior to configuration of a web service connection. In an embodiment of the invention, the metadata connection is used for the retrieval of types from different services deployed on the same physical system.

In one possible example, for a certain type "country" may have defined all possible country codes (US, DE, BG, . . . ) and all possible display names (United States, Germany, Bulgaria), which in addition can be translated in various languages for different installations. In an embodiment of the invention, the enumerated values are stored only on the provider systems, with consumer systems to retrieve such from the provider system instead of defining the values in all consumer applications.

In an embodiment of the invention, the retrieval of enumerated type values is accomplished through a remote call and thus a metadata connection is configured first for the transfer of this information, with a second connection being configured for access to the web service.

FIG. 1 is an illustration of a computer service in an embodiment of the invention. In this illustration, the computer service 110, which may be a web service, may include multiple different types, shown here as Type1 115 and Type2 120. Each type is defined in a DataDictionary where all restrictions, display names or enumerations of allowed or legal values are defined. For example, Type1 115 may include a first element Element1 135 with certain enumerated values (value1, value2, and continuing to some value) and a second element Element2 140 with certain enumerated values. Further, a Type2 120 may include Element3 145 with certain enumerated values and Element5 150 with certain enumerated values.

In a conventional operation, all such enumerated values are provided to each consumer installation. In an embodiment of the invention, the values for each element are held by a computer service provider as metadata that is provided to a consumer as needed for a computer service. In an embodiment of the invention, a consumer system will retrieve metadata for enumerated elements only as required for access to computer services.

Figure 2:
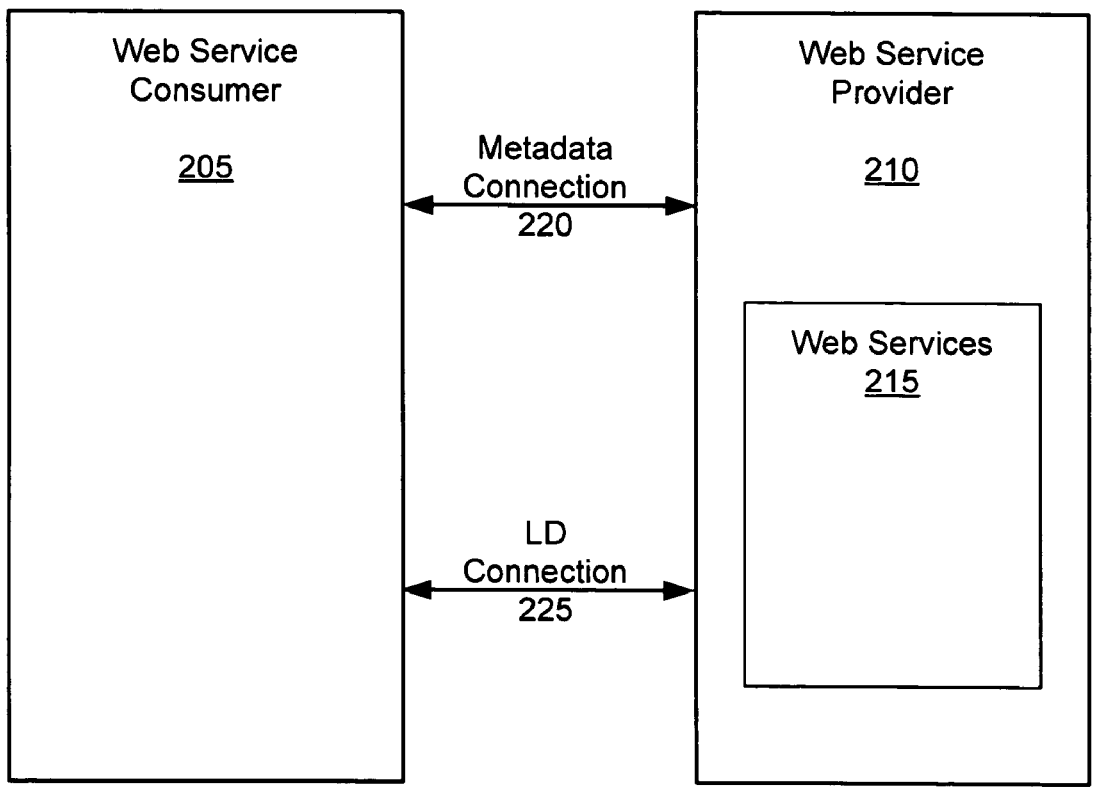
FIG. 2 is an illustration of connections generated for web service access in an embodiment of the invention.

FIG. 2 is an illustration of connections generated for web service access in an embodiment of the invention. In this illustration, a web service consumer 205 is configured with a web service provider 210. The configuration is implemented to enable the web service provider 210 to provide the web service consumer 205 access to web services.

In a one embodiment, a metadata connection 220 is initially configured between the web service consumer 205 and the web service provider 210. The metadata connection 220 is used to provide needed metadata to the web service customer prior to configuration of the connection. Upon receipt of the needed metadata, a connection 225 is established for the purposes of requesting the invocation of the requested web service. In one embodiment, the connection is illustrated as a logical destination (LD) connection, where a logical destination is used as a reference from a consumer system to a provider physical system, thus informing an administrator of the need to create a service connection between the consumer system and the appropriated provider system.

Figure 3:
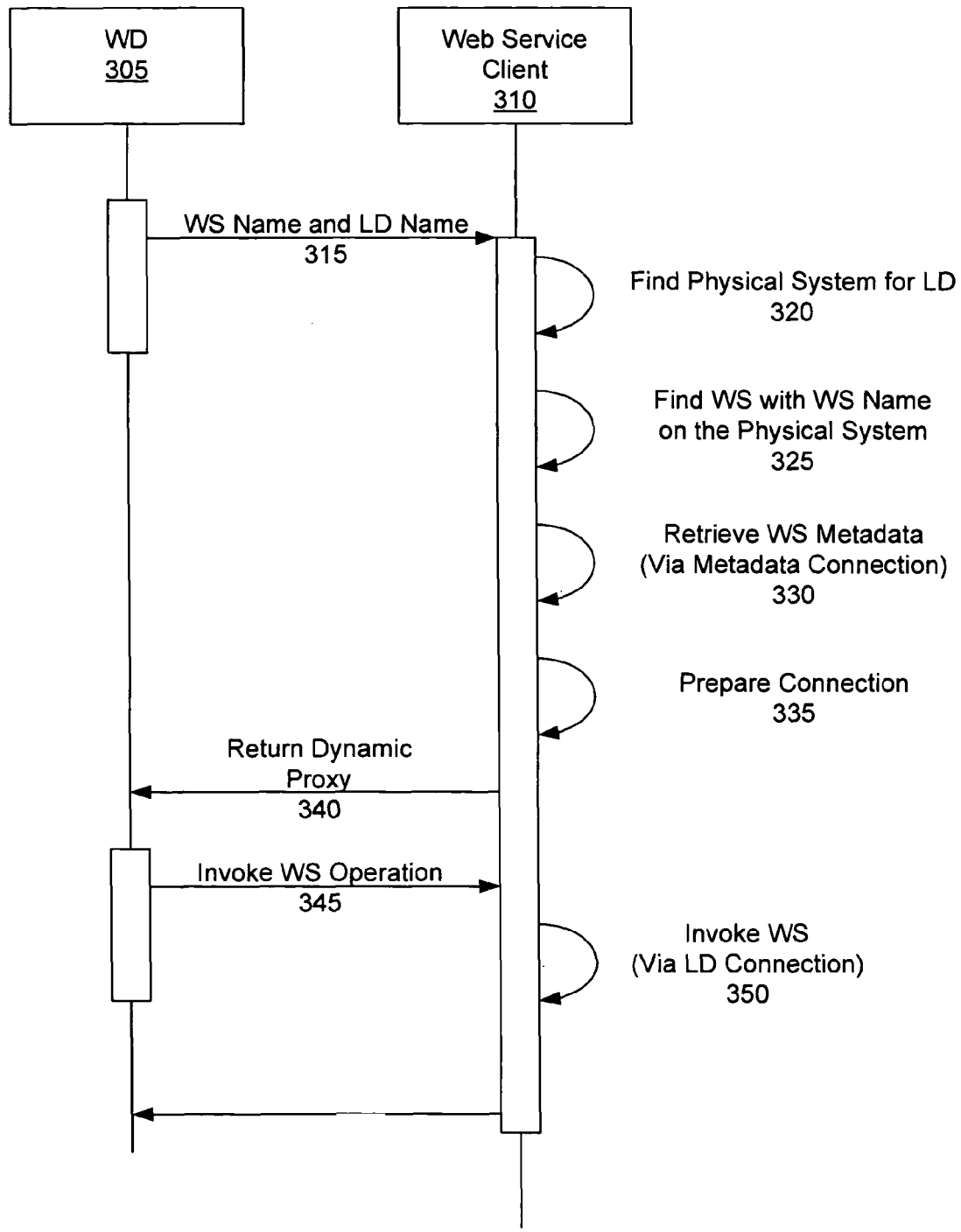
FIG. 3 is an illustration of an embodiment of a process for configuration of a web service connection.

FIG. 3 is an illustration of an embodiment of a process for configuration of a web service connection. In this figure, a consumer application 305 is attempting to invoke a web service through a web service client 310. The consumer application 305 initially provides a web service name and logical destination name 315 to the web service client 310. The web service client 310 proceeds to find the physical system for the logical destination 320 and to find the web service that has the requested web service name on the physical system 325. The web service client 310 then retrieves the web service metadata via a metadata connection 330. A connection is then prepared 335 for the web service access. In one possible embodiment, a dynamic proxy is returned 340 to the consumer application 305. The consumer application then invokes a web service operation 345, resulting in the web service client invoking the web service via an LD connection 350 that has been configured.

Figure 4:
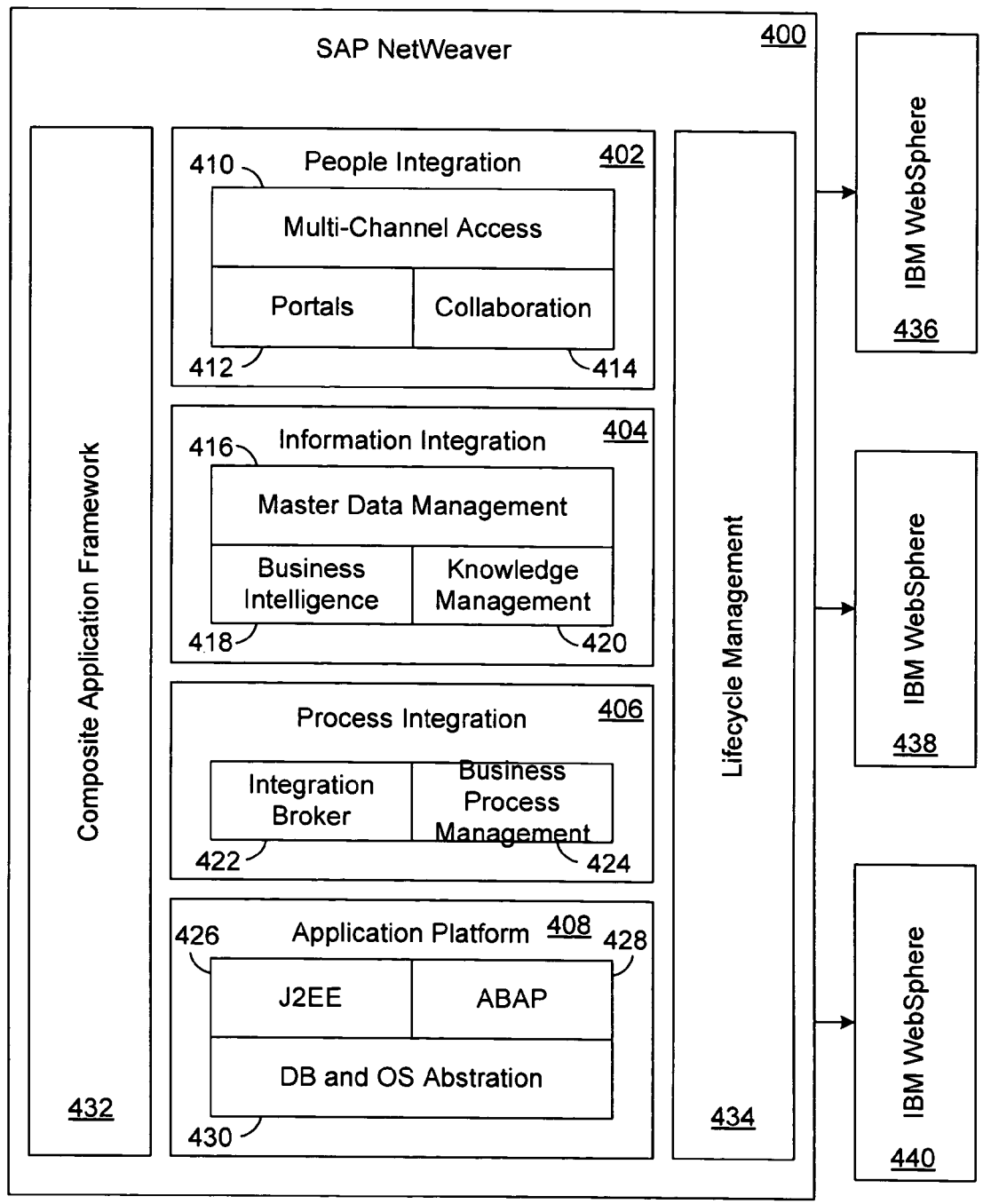
FIG. 4 is a diagram illustrating an embodiment of a system architecture.

FIG. 4 is a diagram illustrating an embodiment of a system architecture. In one embodiment, the diagram illustrates core components of the SAP NetWeaver® architecture 400. The system architecture 400 comprises various SAP platforms that are merged together to provide the integration of people, information, and processes in one solution. The architecture 400 includes people integration 402, information integration 404, process integration 406, and an application platform 408.

People integration 402 is performed using a portal solution 412 and a platform to work in collaboration 414. Users are provided a multi-channel access 410 to ensure mobility. Examples of the portal solution 412 include SAP Enterprise Portal, SAP Mobile Engine, and Collaboration Package for SAP Enterprise Portal. Information integration 404 refers to the conversion of information into knowledge. Information integration 404 provides efficient business intelligence 418 and knowledge management 420 using, for example, SAP products such as Business Information Warehouse (BW) and Knowledge Management (KM). Further, consolidation of master data management beyond system boundaries is performed using SAP's Master Data Management (MDM) 416. Process integration 406 refers to optimized process management using integration broker or SAP exchange infrastructure 422 and business process management 424 techniques. Examples of products to perform process integration 406 include Exchange Infrastructure (XI) and Business Process Management (BPM).

An application platform 408 may include SAP's Web Application Server (web AS), which is the basis for SAP applications. The web AS, which may be independent of the database and operating system 430, includes a J2EE™ (Java™ 2 Platform, Enterprise Edition) engine 426 in combination with the proprietary SAP ABAP™ (Advanced Business Application Programming) engine or instance 428 to further enhance the application platform 408. In one embodiment, the web AS is used to provide web services to a client.

The architecture 400 further includes a composite application framework 432 to provide various open interfaces (APIs—application program interface) and a lifecycle management 434, which is an extension of a previously existing transport management system (TMS). As illustrated, the architecture 400 further provides communication with Microsoft.NET 436, International Business Machine (IBM) WebSphere 438, and other such systems 440.

Figure 5:
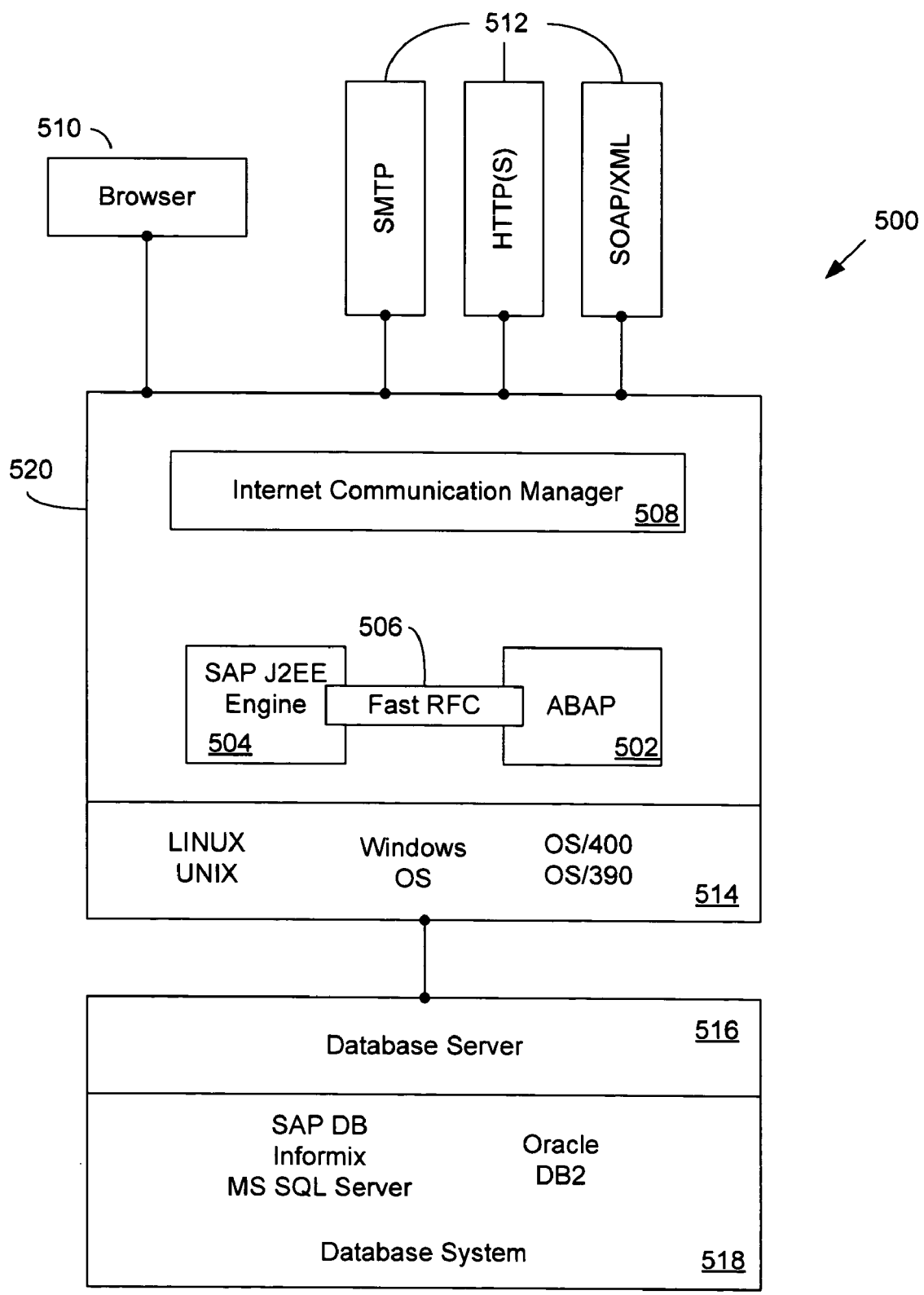
FIG. 5 is a block diagram illustrating an embodiment of an architecture including a web application server.

FIG. 5 is a block diagram illustrating an embodiment of an architecture including a web application server. In this illustration, an architecture 500 serves as an application platform (which may be, for example, the application platform 408 of provided in FIG. 4) for SAP NetWeaver and other SAP products. The architecture 500 includes a web AS 520 having, for example, an ABAP program engine 502, which provides the ABAP development and runtime environment, with the dependability, scalability, and inter-process independence of operating systems 514 and database systems 518. The operating system 514 may include LINUX, UNIX, Windows®, OS/390, OS/400, and other such operating systems. The database system 518 may include SAP database (SAP DB), Informix®, Oracle®, DB2®, and other such database systems. The database system 518 is based on a database server 516, such as Microsoft Sequential Query Language server (SQL Server®).

The web AS 520 with ABAP engine 502 further includes a J2EE program engine 504. The J2EE program engine 504 may support one or more program instances. In this example, the J2EE engine 504 may be in communication with the ABAP engine 502 via a fast remote function call (RFC)

connection 506. The ABAP engine 502 and the J2EE engine 504 are further in communication with an Internet communication manager (ICM) 508. The ICM 508 is provided for handling and distributing queries to various individual components of the architecture 500. The architecture 500 further supports a browser 510, such as Microsoft Internet Explorer, Netscape Navigator, and other modified variations of mobile end devices, such as personal digital assistants (PDAs), pocket computers, smart cell phones, other hybrid devices, and the like. The web application server 520 also supports various protocols and standards 512, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 6:
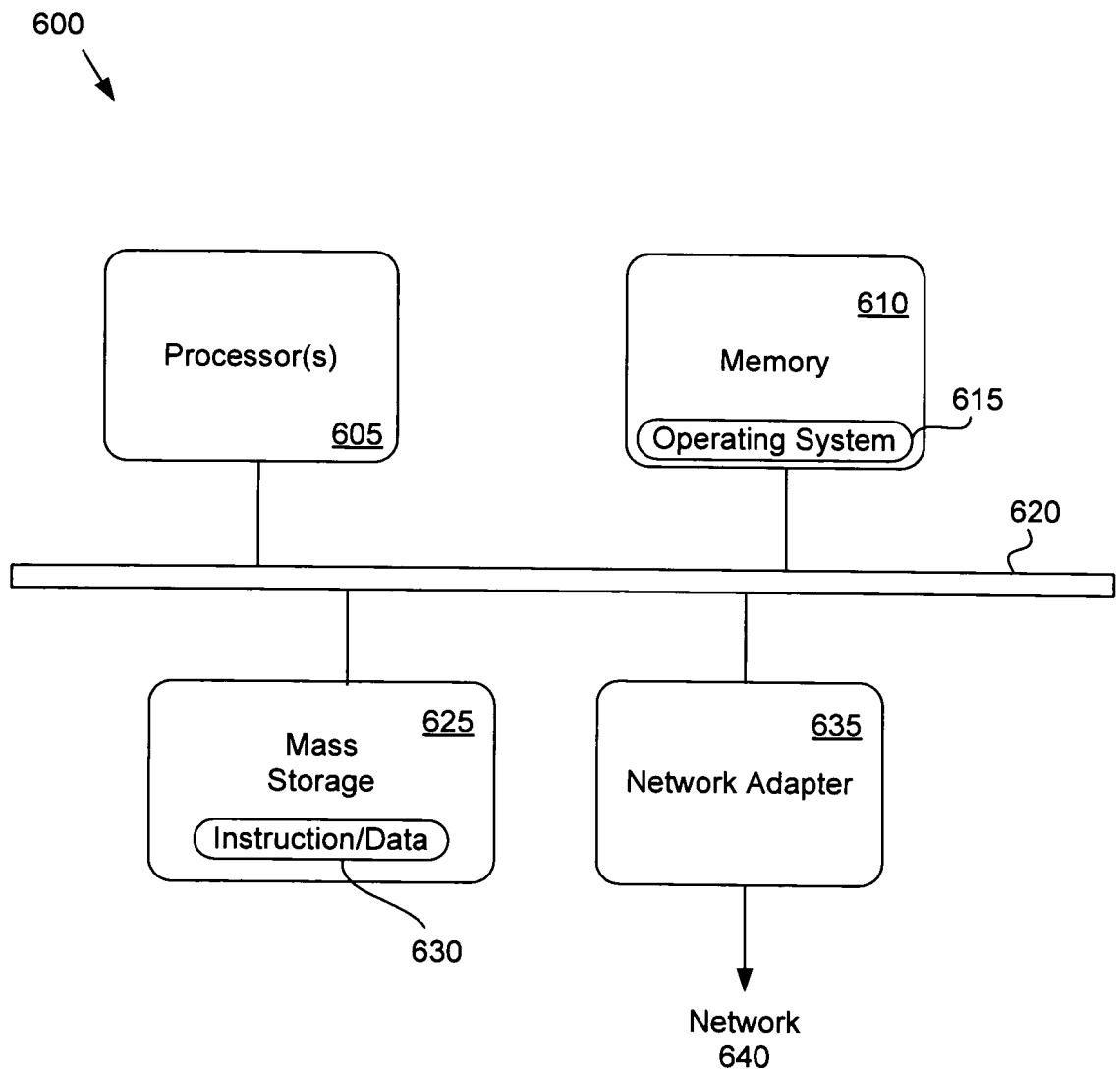
FIG. 6 is an illustration of a computer system in an embodiment of the invention.

FIG. 6 is an illustration of a computer system in an embodiment of the invention. As illustrated, a computing system 600 can execute program code stored by an article of manufacture. The computing system illustrated in FIG. 6 is only one of various possible computing system architectures, and is a simplified illustration that does include many well-known elements. A computer system 600 includes one or more processors 605 and memory 610 coupled to a bus system 620. The bus system 620 is an abstraction that represents any one or more separate physical buses, point-to-point connections, or both connected by appropriate bridges, adapters, or controllers. The bus system 620 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 6, the processors 605 are central processing units (CPUs) of the computer system 600 and control the overall operation of the computer system 600. The processors 605 execute software stored in memory 610. A processor 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 610 is or includes the main memory of the computer system 600. Memory 610 represents any form of random access memory (RAM), read-only memory (ROM), flash memory, or the like, or a combination of such devices. Memory 610 stores, among other things, the operating system 615 of the computer system 600.

Also connected to the processors 605 through the bus system 620 are one or more internal mass storage devices 625 and a network adapter 635. Internal mass storage devices 625 may be or may include any conventional medium for storing large volumes of instructions and data 630 in a non-volatile manner, such as one or more magnetic or optical based disks. The network adapter 635 provides the computer system 600 with the ability to communicate with remote devices, over a network 650 and may be, for example, an Ethernet adapter.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Embodiments may include a computer-readable storage medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
receiving a computer service request from a consumer system at a service provider, the computer service comprising a web service, the computer service having metadata for use in operating the computer service, the metadata including one or more types for variables that are used in the operation of the computer service, each type including a set of enumerated allowed values for a variable;
configuring a first connection between the consumer system and the service provider, the first connection being a metadata connection for transfer of the metadata from the service provider to the consumer system;
providing the set of enumerated allowed values for each of the variables from the service provider to the consumer system via the first connection;
subsequent to providing the enumerated allowed values for the variables via the first connection, configuring a second connection between the consumer system and the service provider, the second connection being a service connection to provide access to the computer service for the consumer system; and
invoking the computer service in response to a request made by the consumer system via the second connection;
wherein the consumer system does not maintain the sets of enumerated allowed values for the variables.

2. The method of claim 1, wherein the second connection is a logical destination connection, the logical destination connection providing notice that the service connection is needed between the service provider and the consumer system.

3. The method of claim 1, wherein the sets of enumerated allowed values that are provided are limited to elements that are required to access the computer service.

4. The method of claim 1, wherein the one or more types are defined in a DataDictionary at the service provider, a definition for a type including any restrictions, display names, and the enumerated allowed values.

5. The method of claim 1, wherein the set of enumerated allowed values for a first variable comprises a range of values for the first variable.

6. The method of claim 1, wherein the set of enumerated allowed values for a first variable comprises a set of character strings that may be used in the first variable.

7. The method of claim 1, wherein the request includes a name of the computer service and a logical destination.

8. The method of claim 7, further comprising finding a physical system for the logical destination and find the computer service.

9. A server comprising:
a processor to process applications;
a memory to store a plurality of applications, a first application of the plurality of applications being a consumer of a first web service, the first web service including metadata for the first web service, the metadata for one or more types, each type having a set of enumerated allowed values for a variable used in the first web service, and
a link to a web service provider, the link including:
a first connection between the server and the web service provider for the transfer of metadata, the server to receive metadata from the web service provider for the first web service via the first connection, the metadata including the sets of enumerated allowed values for the variables used in the first web service, and
a second connection between the server and the web service provider, the second connection being a service connection for the invocation of the first web service, the second connection to be established after the sets of enumerated allowed values for the variables are transferred, the server to request invocation of the first web service via the second connection;
wherein the server does not maintain the sets of enumerated allowed values for the variables in the memory.

10. The server of claim 9, wherein the second connection is a logical destination connection, the logical destination connection providing notice that the service connection is required between the web service provider and the server.

11. The server of claim 9, wherein the first application is also a consumer of a second web service, wherein the second web service includes one or more types, and wherein the one or more types includes a type that has the same set of enumerated allowed values for a variable as a type of the one or more types of the first web service.

12. A computer-readable medium having stored thereon data representing sequences of instructions that, when executed by a processor, cause the processor to perform operations comprising:
receiving a web service request from a web service consumer at a web service provider, the web service including one or more types for variables that are used in the operation of the web service, each of the one or more types having a set of enumerated allowed values for a variable;
configuring a first connection between the consumer system and the web service provider for provision of web service metadata;
providing metadata containing the set of enumerated allowed values for each of the variables via the first connection;
subsequent to providing the enumerated allowed values for the variables via the first connection, configuring a second connection between the consumer system and the web service provider to provide web service access for the consumer application;
receiving a call from the web service consumer for the web service via the second connection; and
invoking the web system for the web service consumer in response to the call made via the second connection;
wherein the web service consumer does not maintain the sets of enumerated allowed values in storage.

13. The computer-readable medium of claim 12, wherein the sets of enumerated allowed values that are provided are limited to elements that are required to access the computer service.

14. A system comprising:
a web service consumer embodied in a first set of instructions stored in a machine readable medium and executable by a processor, the web service consumer being a consumer of a web service, the web service including one or more types, each type having a set of enumerated allowed values for a variable for the web service; and
a web service provider embodied in a second set of instructions stored in a machine readable medium and executable by a processor, the web service provider to provide access to the web service, the web service provider maintaining metadata including the set of enumerated allowed values for each of the variables, the web service provider to receive a request for a computer service from the web service consumer;
wherein the web service provider is to configure:
a metadata connection between the web service provider and the web service consumer, the web service consumer to receive the metadata regarding the set of enumerated allowed values for each of the variables from the web service provider via the first connection, and
a service connection between the web service provider and the web service consumer, the service connection to be configured after the set of enumerated allowed values are provided via the metadata connection, the web service consumer to request invocation of the web service via the service connection, the web service provider to invoke the web service in response to the request from the web service consumer; and
wherein the web service consumer does not maintain the sets of enumerated allowed values for the variables.

15. The system of claim 14, wherein the sets of enumerated allowed values that are provided to the web service consumer are limited to elements that are required to access the web service.

* * * * *